March 21, 1939.　　J. M. McDONNELL　　2,150,932
METHOD OF AND MEANS FOR PRODUCING STEREOSCOPIC PHOTOGRAPHS
Filed June 25, 1936　　6 Sheets-Sheet 1

INVENTOR
JOHN M. McDONNELL

March 21, 1939.   J. M. McDONNELL   2,150,932
METHOD OF AND MEANS FOR PRODUCING STEREOSCOPIC PHOTOGRAPHS
Filed June 25, 1936   6 Sheets-Sheet 6

INVENTOR
JOHN M. McDONNELL
BY Robert V. Laughlin
and Wade Moriety
ATTORNEYS

Patented Mar. 21, 1939

2,150,932

UNITED STATES PATENT OFFICE 2,150,932

METHOD OF AND MEANS FOR PRODUCING STEREOSCOPIC PHOTOGRAPHS

John M. McDonnell, Dayton, Ohio

Application June 25, 1936, Serial No. 87,242

17 Claims. (Cl. 88—16)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to photographic apparatus and more particularly to cameras provided with lenticulated film for producing the effect of relief and depth.

It is an object of this invention to provide in photographic apparatus of this character new and novel means for continuously training an objective lens upon a stationary focal point during synchronous movement of camera and shutter aperture with respect to an object to be photographed in relief.

With the foregoing and other objects in view which will appear as the description proceeds, the invention consists of certain new and novel features and combinations, which will be hereinafter more fully illustrated and described in the accompanying drawings and more particularly pointed out in the appended claims.

Referring to the drawings, in which numerals of like character designate similar parts throughout the several claims:

The principal factors which combine to produce the effect of relief and depth, or binocular vision, are the separation and accommodation of the human eyes and their convergence.

In viewing a three-dimensional object or natural scene, the visual axes of the eyes converge upon a point in the object and, being accommodated to that point, the immobile eyes see distinctly only that comparatively small portion of the object whose image is formed on or in the immediate vicinity of the most sensitive part of each retina, known as the fovea centralis. At the same time, a less distinct impression is obtained by indirect vision of all other points within the field of view.

Figure 1:
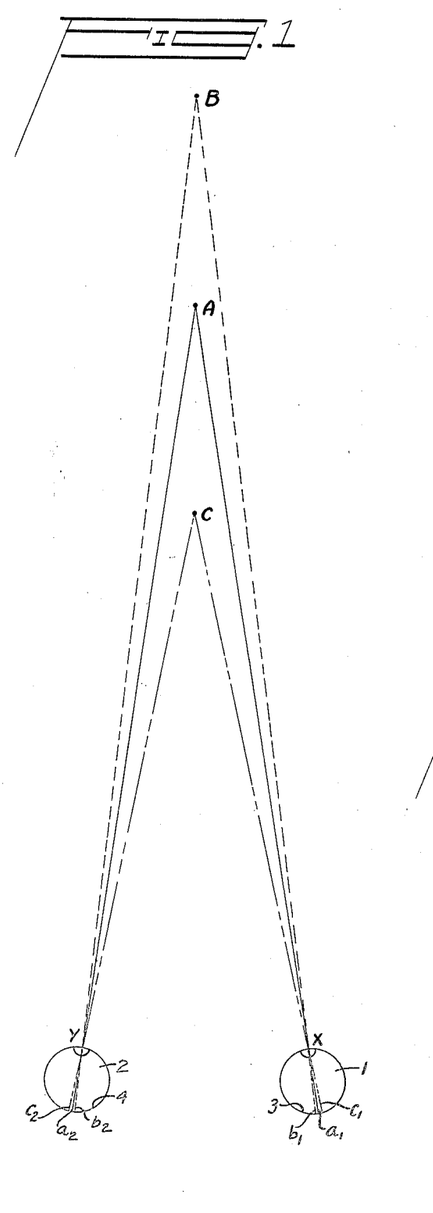
Fig. 1 is a plan view of the observation of three objects, the second and third of which are directly behind the first.

A ready understanding of the foregoing may be had by reference to Fig. 1 in which the visual axes AX and AY of right and left eyes 1 and 2 are seen to intersect at a common point A. When the eyes 1 and 2 are thus focused on the point A, rays entering the same from the point A will fall on the same parts of retinas 3 and 4, as illustrated by the images $a_1$ and $a_2$, respectively, and a mental impression of a single fused image of point A is formed. With the visual axes AX and AY still intersecting at the point A, it will be noted that rays entering the eyes 1 and 2 from the point B follow a path represented by axes BX and BY and that they produce images $b_1$ and $b_2$ on the retinas 3 and 4, respectively. In like manner, rays from the point C enter the eyes 1 and 2 on the axes CX and CY, to form the images $c_1$ and $c_2$ on the retinas 3 and 4, respectively. Due to the increase in angle of divergence of the rays from the point C and the decrease in angle of divergence of the rays from the point B over those transmitted from the point A, images of point B and point C fall on different parts of retina 3 than they do on retina 4 and therefore a mental impression of separate or infused images of points B and C is obtained. It will be further noted that the image $b_1$ on the retina 3 is displaced to the left or nasal side of the image $a_1$ and that the image $b_2$ is displaced on the retina 4 to the right or nasal side of the image $a_2$. Similarly, the images $c_1$ and $c_2$ are displaced to the outer or temporal sides of the axial images $a_1$ and $a_2$, respectively.

It is obvious from the foregoing that, in looking at a three dimensional object, or scene, the complete image pattern formed on one retina is never exactly the same as the image pattern formed on the other since some component points or portions of the pattern occupy identical positions on each retina, while other points do not. It is this difference between the two retinal image patterns which is translated by the brain into the binocular effect in natural vision.

To obtain stereoscopic relief effects by photographic methods, therefore some means must be provided which will not only reproduce these essential differences in the two retinal image patterns but will also insure that the point images which combine to make up the complete image pattern are formed in their proper relative positions on each retina.

The refracting systems and methods of operation hereinafter described, applied in accordance with the known optical principle of the reversibility of the light path, will accomplish the required results, for, by these means, the direction of light rays is so fixed or controlled in the taking and in the viewing of the photograph that image points are formed on each retina in the same relative positions as they would be formed were the eyes placed in the same position as that occupied by the camera lens when the photograph was taken.

Figure 2:
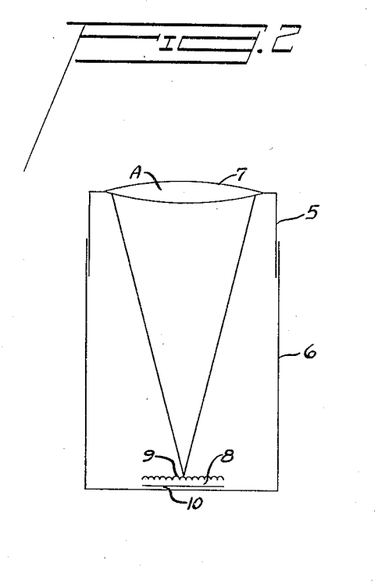
Fig. 2 shows an objective lens focused upon a lenticulated film.

A diagrammatic representation of the optical system essential to my invention is shown in Fig. 2. Telescoping housing portions 5 and 6 are provided for mounting an objective lens 7 and a sensitized film 8. As shown in Fig. 2, the lens 7 is so adjusted in front of the film 8 that a lenticulated surface 9 provided in the latter will lie in the focal plane of a near point in the object photographed.

Figure 3:
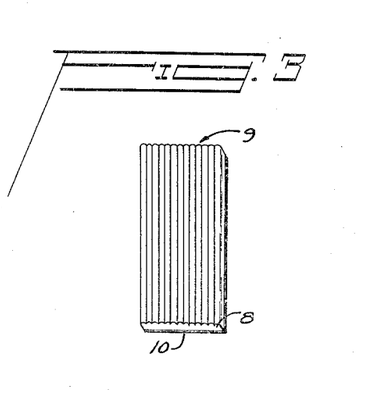
Fig. 3 shows an oblique view of a portion of the above film.

The lenticulated surface 9 is composed of an impressed or molded system of contiguous refracting surfaces cylindrical in form. The opposite surface of the film 8 is provided with a coating or layer of light-sensitive photographic emulsion 10. A small portion of the film 8 is illustrated in Fig. 3.

Figure 4:
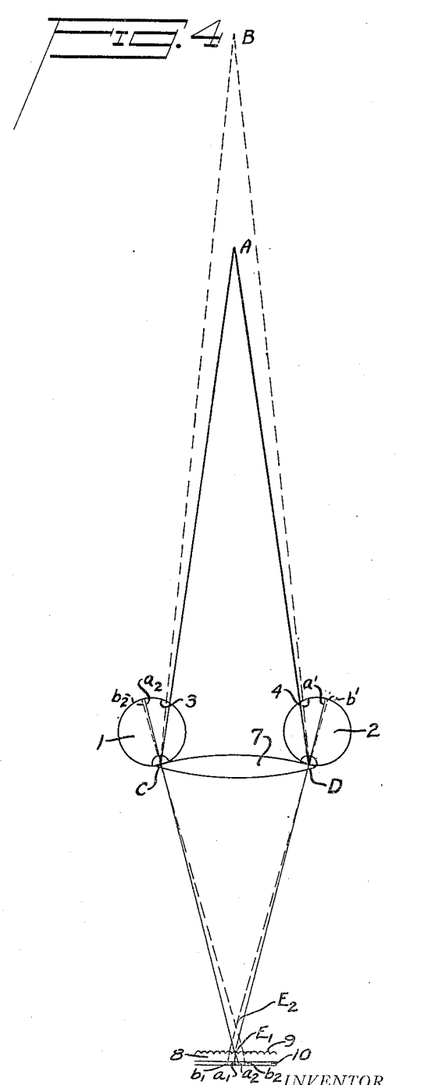
Fig. 4 illustrates ray passage from a near and a far point on the lens axis.

Fig. 4 illustrates the general law of optics known as "principle of the reversibility of the light path" as it is applied in my invention. Selected rays of light projected from the point A follow the light paths AD and AC, respectively, and, being refracted by the lens 7, meet at a common focal point $E_1$, which lies in the plane of the upper film surface, hereinabove referred to by the numeral 9. Upon leaving the surface 9, the rays are further refracted to the emulsion 10 and form images $a_1$ and $a_2$. If the processed film is now illuminated from the emulsion side, the rays from image $a_1$ will retrace their original path and will thus follow the route $a_1E_1DA$ and, in like manner, rays from image $a_2$ will follow route $a_2E_1CA$. If the processed film is now viewed from the positions D and C previously occupied by the outer periphery of the lens 7, as illustrated by eyes 1 and 2, the eye 2 will receive the rays from image $a_1$ and the eye 1 will receive the rays from image $a_2$, but neither eye will be able to see both images simultaneously.

A method based on a somewhat similar principle has been suggested in an article by Herbert E. Ives entitled "Parallax panoramagrams for viewing by reflected light", published in vol 20, 1930, Optical Society of America Journal, in which the photograph is made with the camera in a fixed position as in common photographic practice. This method is also shown in Figure 4 in which A is a near point focused on and B a more distant point. Light rays from the near point have previously been noted as forming images $a_1$ and $a_2$ in the emulsion 10. Since the rays from the point B fall upon the lens 7 at a lesser angle of incidence than those from point A, they focus or intersect at a common point $E_2$ in a plane at some distance in front of the plane of the lenticulated surface 9 and therefore diverge to form images $b_1$ and $b_2$ in the emulsion 10. If the eyes 1 and 2 are now placed in the position previously occupied by the periphery of the lens 7, the rays from image $b_1$ fall on the retina 4 in a position to the temporal side of the axial image $a_1$ and the rays from image $b_2$ fall on the retina 3 in a position to the temporal side of the image $a_2$. If Figures 1 and 4 are now compared, it will be noted that the rays from the photographic images $b_1$ and $b_2$, Figure 4, fall on each retina in positions laterally opposite to those shown in Figure 1 when the natural objects A and B are observed. In other words, when a photograph made by the foregoing method is viewed, the retinal images of point B would be formed on the temporal side of the image of A, whereas, in viewing the natural points A and B, the retinal images of B would be formed on the nasal side of the images of A. The method just described, therefore, will produce only inverted relief or pseudoscopic effects, since point B will appear to be in a plane between A and the eyes instead of at a distance beyond A.

It is evident from the foregoing that to obtain retinal image patterns which will produce the mental impression of relief and depth or stereoscopic effect, the rays from the photographic image points must be so directed that they will be received by the eyes from the same relative angles of direction as rays from the original points in the object photographed would be received were the eyes placed in the same position as that occupied by the camera lens when the photograph was taken.

Since the lenticulated surface 9 of the films 8 shown in Figures 2, 3 and 4 direct the rays projected from image points in the emulsions 10 back along their original light paths, it is apparent that to produce true stereoscopic effects when the photograph is observed the paths of direction of the original image-forming rays must be such that, when reversed, the rays will approach the eyes from their proper relative angles of direction as described in the preceding paragraph.

Figures 5, 6:
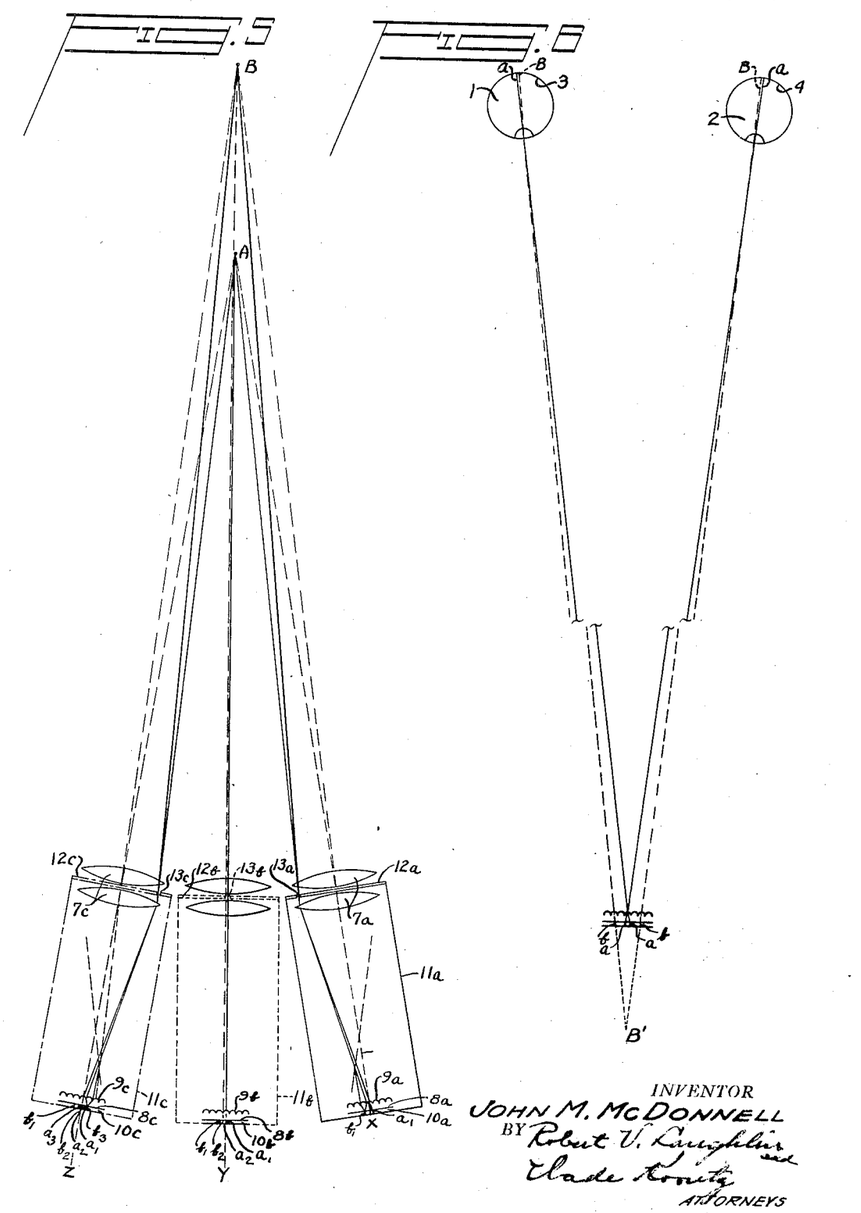
Fig. 5 is a diagrammatic representation of one form of my invention.
Fig. 6 shows diagrammatic observation of the film processed in Fig. 5.

If, for the purpose of demonstrating the elementary optical principles of this invention, an exposure is made with the camera in position $11a$ and the slot in position $13a$, Figure 5, rays from point A will form image $a_1$ and rays from the point B will form image $b_1$ in the emulsion 10. Let it next be assumed that the camera is swung into position $11b$ and the slot into position $13b$ and that a second exposure is made. In addition to the images of position $11a$, rays from the points A and B will now have formed images $a_2$ and $b_2$ in the emulsion 10. Since points A and B now lie in a common axis AY, image $a_2$ may also be considered as representing image $b_2$. Let it be finally assumed that a third and final exposure be taken with the camera in position $11c$ and the slot in position $13c$. Rays from the point A will form image $a_3$ and rays from the point B will form image $b_3$ in the emulsion 10 in addition to the images $a_1$, $b_1$, $a_2$, and $b_2$ referred to above. If the processed film be viewed by transmitted light, as shown in Fig. 6, rays from the photographic images $a_1$, $b_1$ and $a_3$, $b_3$ hereinabove enumerated are projected to the eyes 1 and 2 in the same related angles of direction as shown in Fig. 1. Therefore, the images of the points A and B will be formed on the retinas 3 and 4 in their proper relative position, as in natural binocular vision and the virtual image of B will appear to be at a distance beyond the plane of the image of A. It should be noted that the same effect will be produced if the swinging of the camera, with retained adverse diaphragm movement, is changed from clockwise to counter-clockwise rotation.

The preceding paragraph described the effect upon the emulsion 10 of making three separate exposures of points A and B with the camera in positions 11a, 11b, and 11c for purposes of illustration only. In the complete process used in this invention, however, during the period of time required to properly expose the film 8, the camera 11 is moved from right to left (or from left to right) a specific distance while the slot 13, in synchronism with the movement of the camera 11, traverses the field of the lens 7 in the opposite direction. The camera 11 is moved the required distance in a horizontal direction along the arc of a circle the radius of which must be the distance between the lens 7 and a selected point in the near object or foreground focused on. During the period of movement, the axis of the lens 7 must be maintained substantially coincident with a radial line extending from the center of the lens 7 to the selected point, as shown in Fig. 5.

The distance of lateral movement of the lens-camera will be as follows: In using a lens of 6-inch focal length or less, the distance of lateral movement must be 2.5 inches (the interocular distance) plus the effective diameter of the lens. For instance, a lens of 6-inch focal length and aperture of F2.4 would have a diameter of 2.5 inches. In this case, therefore, the distance of movement would be 2.5 inches (lens diameter) plus 2.5 inches (interocular distance) or 5 inches measured from the center of the lens when it is in the right-hand position at the start of the movement to the center of the lens when it is in the left-hand position at the completion of the movement, as shown in Fig. 5. When a lens of a focal length greater than six inches is used (the aperture requirements of F2.4 being maintained), the distance of lateral movement of the lens must be increased proportionately with the increase in focal length over six inches. In the case of a lens of 12-inch focal length, for instance, the distance of movement would be 10 inches measured from the center of the lens in the first position to the center of the lens in the last position. The respective movements of camera and diaphragm slot must be such that they will start and complete their movements simultaneously. The slotted diaphragm in this case acts as a light shutter, the speed of movements of camera and slot being regulated in accordance with the exposure required. For a lens of 2½ inches in diameter or larger, the slot should not exceed $\frac{1}{16}$ of an inch in width and the height of the slot should not exceed ⅔ of the diameter of the lens.

Figures 10, 11:
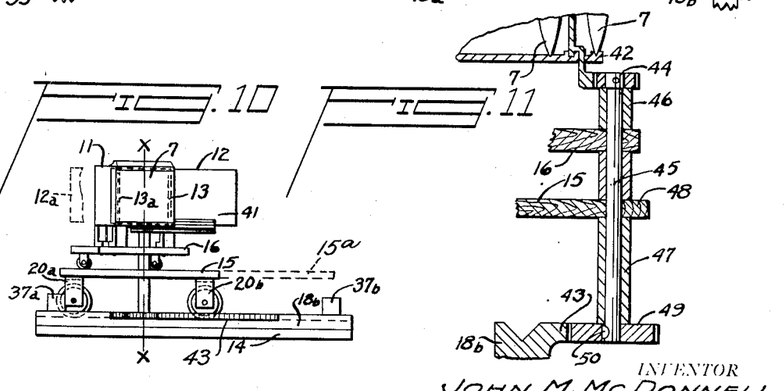
Fig. 10 is an end view of the above embodiment.
Fig. 11 is a cross-sectional view taken on the line 11—11 of Fig. 8.
Figure 17:
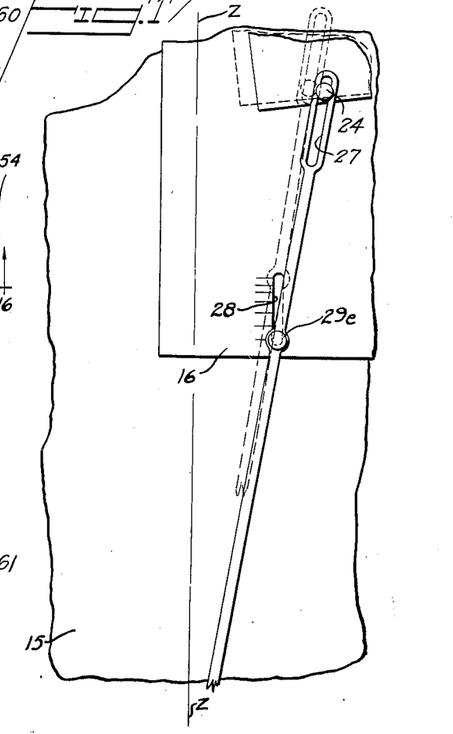
Fig. 17 shows diagrammatically how the above fixed point is moved inwardly with reference to the camera.

The lateral movement of the camera may be accomplished by hand, by a spring or by motor-driven mechanism with controllable speeds. The slotted diaphragm may be moved in synchronism with and in the opposite direction to the camera movement by means of a simple double rack and pinion as illustrated in Fig. 11. In order to maintain the axis of the lens substantially coincident with a radial line extending from the center of the lens to the near point selected while the camera is moving from right to left, a mechanism similar in principle to that shown in Fig. 17 may be used.

Instead of making the exposures by the continuous lateral movement method described above, a similar effect will be produced if the camera is given an intermittent lateral movement, in which case a standard diaphragm or focal plane shutter should be used in combination with the slotted diaphragm to make the exposures. In this case the slotted diaphragm and camera are moved in opposite directions only a fraction of the respective distances required and an exposure made with the standard shutter. The camera and slot are again moved another fraction of the distance and another exposure made on the same film surface and so on until the slot has completely traversed the field of the lens and the camera has completed its lateral movement. To illustrate, let it be assumed that a lens of 6-inch focal length and an effective aperture of 2.5 inches is being used, that the distance of lateral movement of the camera is to be five inches and that the width of the vertical diaphragm slot is $\frac{1}{16}$ of an inch. With the camera and slot in position for the initial movement, an exposure is made with the standard shutter. The slot is then moved a distance equal to its width or $\frac{1}{16}$ inch and the camera moved $\frac{5}{16}$ of an inch and another exposure made with the standard shutter and so on until the slot and camera have completed their required lateral movements.

The following explanation of the effects of the slot and camera movements is pertinent. When the slot has completed its lateral movement across the field of the lens, all of the sensitized area behind each element has been exposed and there is now formed in the emulsion a complete composite image pattern of the object or scene photographed, the patern being made up of a great number of vertical parallel strip images formed by the contiguous refracting elements of the film.

However, while the slot was traversing the field of the lens, the lens itself was changing its position in relation to the objects being photographed. For instance, when the lens was in position 7a, camera position 11a, Fig. 5, point B appeared to the right of point A and was imaged at $b_1$. When the lens had reached the center position 7b, camera position 11b, Fig. 5, point B appeared directly behind A and was imaged at $b_2$. When the lens had reached its last position 7c, camera position 11c, Fig. 5, point B appeared to the left of A and was imaged at $b_3$.

Since point A, Fig. 5, formed the pivot or axis of the lateral movement of the lens and since the rays from point A were focused in the plane of the film surface, images of each point in the plane of A were formed within single lenticular elements. Since these elements are so small (about 300 to the inch with a film of .30 m. m. thickness), there will be no visual displacement of the images within a single element and they will consequently appear as a single point ($a_1$ to $a_3$, Fig. 5). The position of point B, however, continued to change in relation to A as the lenses progressed from right to left and the slot from left to right and, consequently, images of each point in the plane of B were formed within a number of lenticular elements (i. e., images of point B are in all the elements lying between $b_1$ and $b_3$, Fig. 5).

Therefore, due to the natural convergency of the eyes to a point in the plane observed and the fact that each point in the near or foreground plane of the scene photographed has been imaged within a single element of the film 8, when the processed film is viewed with the lenticulated surface 9 facing the eyes, all rays from each of these point images which enter the eyes will fall in the same position on each retina.

On the other hand, each point of a more distant plane, as previously shown, has been imaged within a number of elements of the film 8. However, due to the refracting power of the lenticular elements the numerous images of the single point B are not all visible simultaneously and each eye perceives a different group of the images. Therefore, rays from the multiple images of any one point in the more distant plane which enter the eyes will always fall in a different position on one retina than on the other, as shown in Fig. 6 and, in effect will form a virtual image of B at B'.

In other words, rays from the photographic images of each point of a near plane will form an image in the same position on each retina, whereas at the same time rays from the photographic images of each point of a more distant plane will form an image in a different position on one retina than on the other but in their proper relative positions in each retinal image pattern.

In viewing the film against a light, therefore, the effect will be that the images of near points such as the point A appear to occupy a fixed position and to establish the principal plane of the picture, whereas the virtual images of distant points such as B appear to lie in planes at a distance beyond the plane of point A and to move in a lateral direction in relation to the images of point A as the angle of observation is altered. Thus, an impression of distance and relief is obtained.

Before entering into a description of the first embodiment of my invention whereby I propose to execute the diaphragm-camera housing movement of Fig. 5, it is essential that certain optical requirements of the lens be discussed. The factors which determine the aforesaid lens and film surface optical requirements are the normal separation of the eye, i. e., about 2½ inches, and the maximum angle of convergence of the normal eyes in natural vision. As previously discussed, when an object is viewed, the visual axes of the eyes converge upon a point in the object and the angle thus formed varies with the distance of the object from the eyes. The closer the eyes are to the point observed, the greater the convergence angle and the greater the parallaxial displacement of the retinal images of more distant points, i. e., point B, Fig. 1, which are seen by "indirect" vision. However, there is a lower limit to the effective angle of convergence which is fixed by the power of accommodation of the eyes, since the minimum distance of distinct vision is about six inches, i. e., the minimum distance at which objects can be distinctly seen without an abnormal or fatiguing effort. This is termed the maximum convergence angle of the eyes or the maximum angle of acute observation. In order to reproduce the values of the interocular distance and the maximum convergence angles in the taking and in the viewing of a photograph, the ratio of lens diameter to focal length must be equivalent to the ratio of interocular distance to the minimum distance of distinct vision. Since the normal separation of the eyes is about 2½ inches and the minimum distance of distinct vision is about 6 inches, these data expressed in terms of the fraction of the lens focal length, i. e., the ratio 2.5:6, determine the optically effective aperture requirements for the objective lens of F2.4. In order to maintain the maximum angle of convergence in light rays received from the lens during exposure and, conversely, the maximum angle of "divergence" of rays projected from the images in the film to the eyes in the viewing of the photograph, the optically effective aperture of each refracting element of the film surface must be equivalent to that of the objective lens, i. e., F/2.4. Since these elements must focus on the emulsion 10, the focal length must be equivalent to the thickness of the film. This thickness should not exceed .30 millimeter in photographs which are to be viewed at ordinary reading distances. The radius of curvature and width of the elements may be determined under known optical formula, given the factors of aperture and focal length and the values of the indices of refraction of the film material used. These refracting elements must consist of convexly curved surfaces cylindrical in form having vertical axes which must be impressed or molded into the film surface and be contiguous to one another without gaps between them, as shown in Fig. 5. With a film .30 mm. in thickness, the number of elements for lateral 3 inch would average about 300.

This optical relation of aperture and focal length between the refracting elements of the film and the objective must be maintained in order to preserve the values of the convergence and divergence angles of light rays previously referred to and to avoid the overlapping of or gaps between the element images.

Lenses of any focal length may be used in this process, provided the effective aperture requirements of about F2.4 are fulfilled. In my invention, I make no claim to the method of splitting up the elementary portions of a photographic image pattern by a system of lenticular refracting film surfaces.

With the foregoing paragraphs as a background, I will now pass to a description of the structure disclosed in Fig. 8 through 11 whereby I accomplish the camera-slot movements discussed in the description of Fig. 5. This embodiment of my invention comprises four major elements in conjunction with a number of secondary parts for effecting operative cooperation therebetween. These parts consist of a supporting platform 14, a laterally movable table 15, a camera-housing support 16, and an actuating arm 17. The platform 14 performs the same function as that performed by a conventional camera tripod, being used for the purpose of obtaining initial alignment of a camera upon an object to be photographed. Tracks 18a and 18b are arranged laterally across the forward portion of the platform 14. The under surface of the table 15 is provided with four rollers 19, secured thereto by means of brackets 20. The table 15 and platform 14 are thus held in longitudinal alignment during free lateral movement of the former with reference to the latter. The support 16 is rotatably secured to the table 15 on the vertical axis $x-x$. Finally, the camera housing 11 is fixed in longitudinal alignment with the support 16 by means of bracket 21. To facilitate rotation of the camera housing 11 about the vertical axis $x-x$, the under surface of the support 16 is provided with rollers 22 secured thereto by means of bracket 23. At the rear portion of the support 16 and on the longitudinal axis thereof, there are provided clevis pin 24, washer 25, and cotter pin 26, whereby a slot 27 forward the extremity of the arm 17 is both pivotally and slidably secured to the support 16. The mid rear extremity of the table 15 is provided with a slot 28 for attachment of the central portion of the arm 17 thereto. It should be noted that the vertical axis $x$—$x$ and the slot 28 of the table 15 are in common longitudinal alignment. Arm to table attachment is effected through employment of a shouldered bolt 29, washer 30, and wing-nut 31. The upper surface of the table 15 is provided with graduations 32 for the purpose of effecting predetermined longitudinal adjustment of the shouldered bolt 29. There is fixedly secured to the rear extremity of the platform 14, on the longitudinal center line thereof, a clevis pin 33, a washer 34, and a cotter pin 35 whereby a slot 28 provided in the rear extremity of the arm 17 is pivotally and slidably secured to the platform 14.

Figure 7:
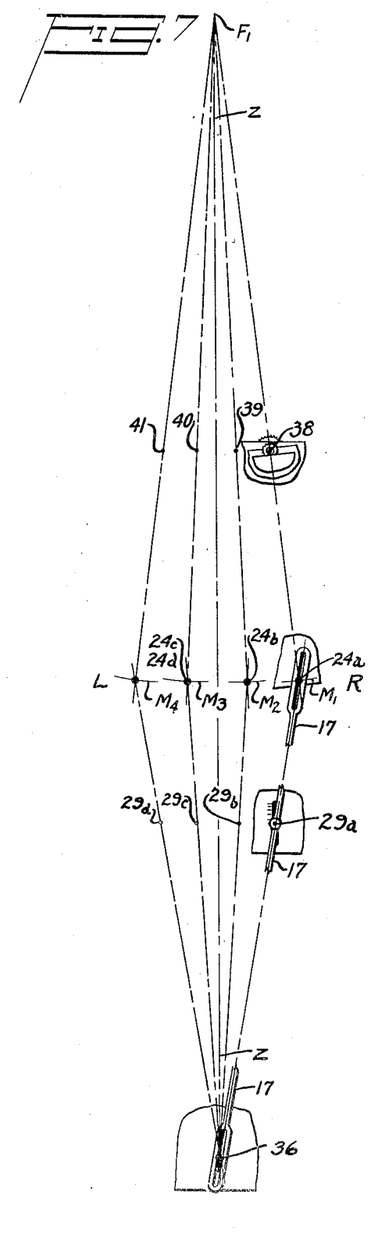
Fig. 7 shows diagrammatically focusing of the first embodiment of my invention upon a fixed point.
Figure 8:
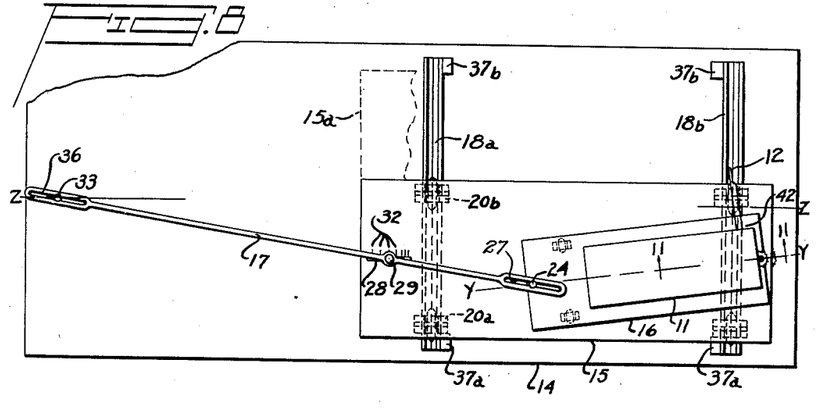
Fig. 8 is a plan view of the first embodiment of my invention.
Figure 9:
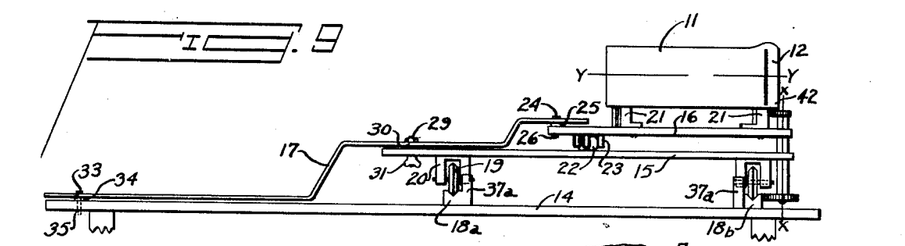
Fig. 9 is a side view of the above embodiment.

As shown in Fig. 10, the table 15 is in the extreme right-hand position, the right-hand stops 37a forming an integral part of the tracks 18a and 18b being in contact with the right-hand pair of roller brackets 20a. The left-hand extremities of the tracks 18a and 18b are provided with duplicate stops 37b for arresting the left-hand pair of roller brackets 20b when the table 15 is moved laterally across the platform into position 15a. It should be noted that mid-travel of the table 15, from extreme right-hand to extreme left-hand position, brings the longitudinal axis of the arm 17 and the longitudinal axis $z$—$z$ of the platform 14 into plan coincidence. Interrelated displacements of the table 15, the support 16, and the arm 17 with reference to the stationary platform 14 may be readily understood upon reference to Fig. 7. With retention of the scale and initial part disposition shown in Fig. 8, three additional right to left positionings of the camera housing 11 are shown diagrammatically. The shouldered bolt 29 is plotted for three equally-spaced left-hand positionings 29b, 29c, and 29d in addition to the initial position 29a shown in Fig. 7. Since the shouldered bolt 29 and the vertical axis $x$—$x$ are in common longitudinal alignment with and fixed to the table 15, the vertical axis $x$—$x$ must take the initial position 38 and then progressively assume positions 39, 40 and 41 corresponding respectively in lateral spacing to positions 29a, 29b, 29c and 29d of the aforementioned shouldered bolt 29. If, prior to the aforesaid bolt-axis movement, the arm 17 be considered removed, the support 14 at the point of clevis pin 24 attachment will be free to describe arcs $m_1$, $m_2$, $m_3$, and $m_4$ for corresponding positions 38, 39, 40 and 41 of the vertical axis $x$—$x$. It is the purpose of the arm 17 to definitely locate four points (24a through 24d) upon the four arcs $m_1$, $m_2$, $m_3$, and $m_4$ in longitudinal alignment with the fixed clevis pins 36 located upon the longitudinal center line of the platform 14 and the positions 29a, 29b, 29c, and 29d of the aforesaid shouldered bolt 29. It is readily seen from the diagram of Fig. 7 that the latter four points, when joined in a straight line with positions 38, 39, 40 and 41 of the vertical axis $x$—$x$, will meet in a common point $F_1$ located on the longitudinal axis $z$—$z$ of the platform 14. Thus, with the aforesaid part disposition, the longitudinal axis of the camera housing 11 is focused upon the point $F_1$ during all lateral movement of the table 15. It is further self-evident that rearward movement of the shouldered bolt 29 into the position 29e shown in Fig. 17 will cause the aforesaid point F to move rearward into position $F_2$, i. e., downward, upon the axis $z$—$z$. It is equally self-evident that movement of the aforesaid bolt toward the forward portion of the table 15 will cause forward movement of the aforesaid point F away from the clevis pin 36 fixed to the rear of the platform 14.

During movement of the table 15 from the initial position shown in Fig. 10 to the dotted position 15a, it is essential that the diaphragm slot 13 pass from the initial position shown in Fig. 10 to the dotted position 13a, at which time the left-hand extremity of the diaphragm 12 will be in position 12a and the brackets 20a will be in contact with the stops 37a. The aforesaid backward or retarded movement of the diaphragm 12 with forward or left-hand movement of the camera housing 11 is accomplished by means of a rack 42 depending from the mid lower portion of the diaphragm 12. The outer central portion of the track 18b is provided with a like rack 43 approximately double in length to that of the rack 42. A pinion gear 44 is provided with shaft extension 45, being maintained in operable engagement with the rack 42 by means of a loose collar 46 resting upon the top surface of the support 16 as best shown in Fig. 11. The support 16 is held in proper spaced relation from the table 15 by means of a tube 47 fixed to the forward edge of the table 16 by means of a pin 48. The lower end of the tube 47 positions a pinion gear 49 in proper vertical spaced relation to the rack 43. The latter pinion is fixed to the extension shaft 45 by means of a key 50. The gear ratio of the pinions 44 and 49 is such that the diaphragm slot 13 will travel to position 13a with movement of the brackets 20b from the initial position shown in Fig. 12 to contact with the stops 37b.

Figure 12:
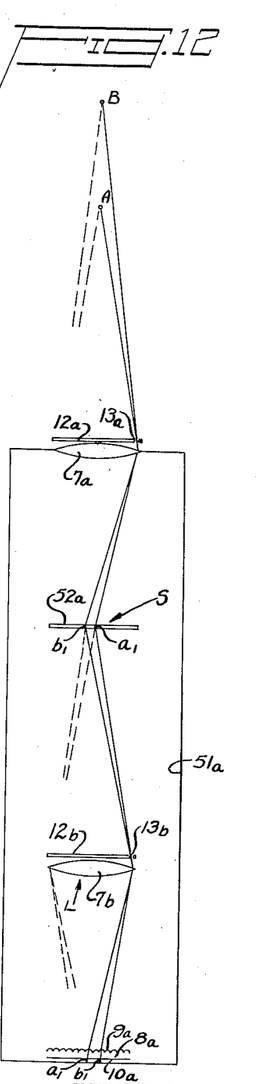
Figs. 12 through 14 are diagrammatic representations of a second embodiment of my invention, showing progressive slot settings comparable to the settings of Fig. 5.
Figure 13:
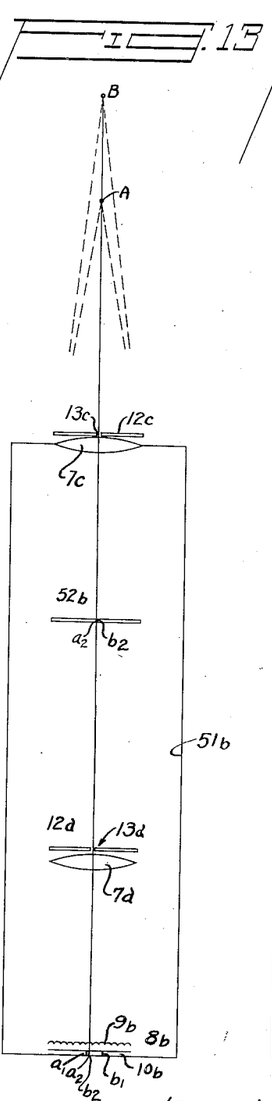
Figure 14:
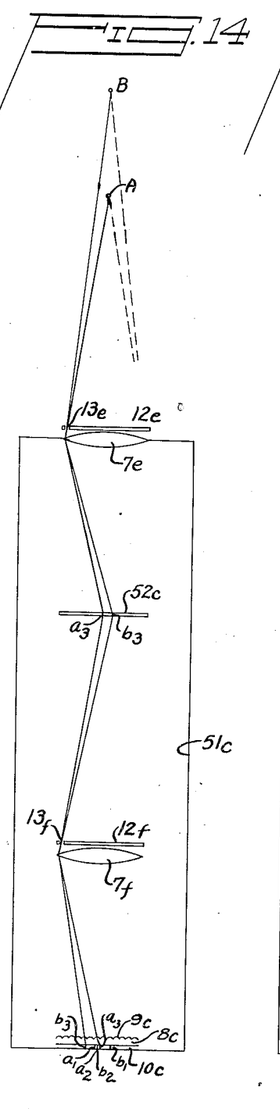

Figs. 12, 13 and 14 are diagrammatical representations of a second embodiment of my invention based upon the same optical principles as those set forth above and one which will produce equivalent results without any movement of the camera proper. As in the case of the central camera position 11b, shown in Fig. 5, the points A and B of Figs. 12, 13 and 14 are located on the lens axes. Unlike the structure of Fig. 5, however, in Fig. 12 a translucent screen of ground glass 52a (fixed to housing 51a), a second diaphragm 12b, and a second lens 7b have been interposed between the lens 7a and the lenticulated film 8a. Since it is essential that the diaphragm 12a move simultaneously and in equal lateral spaced relation with diaphragm 12b, it is necessary to provide the diaphragm operating mechanism set forth in Figs. 15 and 16 which will hereinafter be described in detail.

Referring to Fig. 12, the lens 7a must be about F2.4 as heretoforementioned in the description of Fig. 5. In the particular arrangement herewith described, however, the effective diameter of the lens 7a must be at least 2½ inches. The lens 7b must also have an aperture of F2.4 but may be of a diameter larger or smaller than 2½ inches. The focusing screen 52a, in the form of a translucent screen of finely ground glass, flashed opal glass, or other suitable material, is placed in the focal plane of the lens 7a. The lens 7b is then placed in a position behind the screen 52a on the prolongation of the axis of lens 7a. The lenticulated film 8a, which must be identical in optical specification to the specifications of the lenticulated film 8 shown in Fig. 5 is placed in the focal plane of the lens 7b. Lens 7b must be at such distance from the screen 52a and from the film 8a that light rays from the screen images will be focused by lens 7b in the plane of the lenticulated surface 9a.

In operation, the lens 7a is focused on a near point in the object or scene to be photographed and forms an image of the object or scene on the screen 52a. In turn, an image of the screen image 52a is formed in the film emulsion 10a by lens 7b.

For the purpose of illustrating the action of the slots in controlling the angular direction of light rays which form the film image, the three selected positions of the slots 13a through 13f in their lateral movements are shown in Figs. 12, 13 and 14, the first position as at 13a and 13b, the second or intermediate position as at 13c and 13d, and the last position as at 13e and 13f.

When the slots 13a and 13b are in their first position, as shown in Fig. 12, rays from near points such as point A pass through the slot 13a and form a sharp image of A on the screen 52a at $a_1$. However, rays from a more distant point such as point B, since they are refracted by the lens 7a at a greater angle of convergence than rays from near points, form an image of B on the screen 52a at $b_1$. Rays from these screen images, in turn, pass through the slot 13b and form images in the film emulsion 10a at $a_1$ and $b_1$.

When the slots 13c and 13d are in their intermediate position of movement, as in Fig. 13, images of A and B are formed on the screen 52b at $a_2$ and $b_2$ and in the emulsion 10b at $a_2$ and $b_2$. Correspondingly, when the slots 13e and 13f are in their last positions, as in Fig. 14, images of A and B will be formed on the screen 52c at $a_3$ and $b_3$. It will be seen, therefore, that, as the slots 13 traverse the fields of their respective lenses 7, all the images of A are formed in the same position on the screen 52 and within a single refracting element of the lenticulated film 8, whereas the image of B changes its position on the screen in relation to the screen image of A, as the slot 13 moves from right to left. Correspondingly, images of B, projected by the secondary lens 7b, therefore, are formed within a certain number of film elements, i. e., in all those elements from $b_1$ to $b_3$. An effect is, therefore, produced which is identical with that produced by the moving camera method and as shown in Fig. 5.

Figure 15:
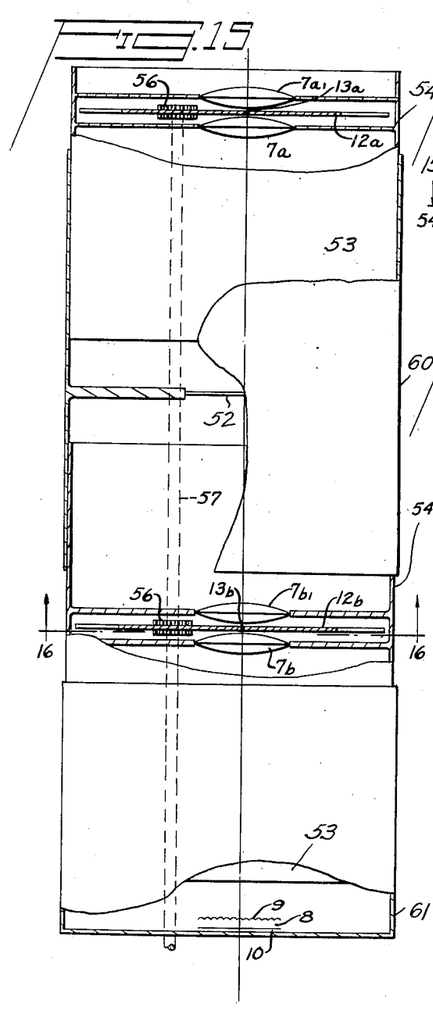
Fig. 15 is a plan view of the second embodiment of my invention with parts broken away and in section.
Figure 16:
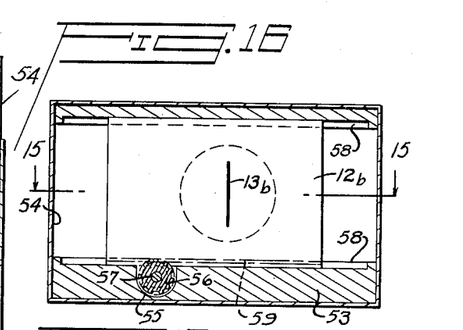
Fig. 16 is a cross-sectional view taken on the line 16—16 of Fig. 15.

In Figs. 15 and 16, a base 53 of a camera housing 54 is recessed at 55 to receive two gears 56 fixedly secured to a drive shaft 57 journaled to the base 53. The diaphragms 12 are adapted to move laterally between the elements of lens 7a and 7b. The lower edges of the diaphragms 12 are provided with racks 59 for operatively engaging the gears 56. Thus, counter-clockwise rotation of the shaft 57, as shown in Fig. 16, will impart right- to left-hand motion of the diaphragms 12. It should be noted at this point that it is immaterial whether the diaphragms 12 be passed from left to right or right to left with reference to the camera housing 54 and the lenses 7a and 7b, but both must move in the same direction. Focusing arrangements are provided for moving the lens 7a forward or backward in order that its images may be sharply focused on the translucent screen 52. This is accomplished by telescopic arrangement between the camera housing 54 and a central camera housing 60 supporting the translucent screen 52. Lens 7b, however, is preferably of fixed focus. In order to maintain the film image at a desired size and also to maintain the maximum convergence angle of the rays incident at the lenticulated surfaces 9a, convex field lens is placed in front of lens 7b. If desired, the camera housing 54 supporting the lens 7b may be telescopically arranged with reference to a rear camera housing 61 supporting the lenticulated film 8.

The alternate methods of making the exposures by continuous lateral movement of the diaphragm slots 13a and 13b or by intermittent lateral movement using a standard diaphragm or focal plane shutter in combination with the diaphragm slots 13a and 13b, as described for the first embodiment of my invention, may be equally applied to the second embodiment of my invention.

The foregoing methods and variations thereof refer to the production of film transparencies which must be viewed by transmitted light. However, these photographs may be viewed by reflected light if the film is developed to a lighter density or a thinner emulsion 10 is used and a coating of white metallic paint or other suitable reflecting material is applied to the back or exposed surface of the emulsion 10.

Having described the invention, it will be obvious to those skilled in the art that the construction shown and described is subject to changes, alterations and modifications. I am fully aware of this and it is to be understood that the specific construction shown in the accompanying drawings is merely illustrative of the present preferred embodiment of my invention and that I consider myself entitled to all such changes and modifications as may fall within the purview and limit of the appended claims.

What I claim is:

1. In a still camera having lenticulated film, each element of which is provided with an effective aperture approximately equal to F2.4, a housing, a slotted diaphragm slidably engaging the forward extremity of said housing, an objective lens having an effective aperture approximately equal to F2.4 and an effective diameter of at least two and one-half inches fixed to said forward housing extremity and covered by said diaphragm, a translucent screen mounted normal to the axis of said lens within said housing in the focal plane position such that the paths of all converging rays passing through said diaphragm slot from a predetermined object point intersect in a common focal point, a like second slotted diaphragm mounted aft of and parallel to said translucent screen freely slidably with respect to said housing, a like second objective lens fixed parallel to and immediately aft of said second slotted diaphragm, a lenticulated film carried in predetermined relation to said second objective lens, and means inducing like simultaneous movement of the aforesaid diaphragm slots across the faces of the aforesaid lenses to cause rays from near object points to intersect or focus in the plane of said film surface and rays from more distant object points to focus virtually in or behind said film, thus, in effect, establishing a reversal of relation of the focal planes of near and distant object points.

2. In a still camera having lenticulated film, each element of which is provided with an effective aperture approximately equal to F2.4, a housing, a slotted diaphragm slidably engaging the forward extremity of said housing, an objective lens having an effective aperture approximately equal to F2.4 and an effective diameter of at least two and one-half inches and covered by said diaphragm, a translucent screen disposed within said housing in the focal plane of the rays of near object points passing through said diaphragm slot, a like second slotted diaphragm mounted aft of and parallel to said translucent screen freely slidable with respect to said housing, a like second objective lens fixed parallel to and immediately aft of said second slotted diaphragm, a film disposed within said housing having its lenticulated surfaces in the focal plane of image rays of near object points in the aforesaid screen passing through said second diaphragm slot, and means inducing like simultaneous movement of the aforesaid diaphragm slots across the faces of the aforesaid lenses to cause rays from near object points to intersect or focus in the plane of said film surface and rays from more distant object points to focus virtually in or behind said film, thus, in effect, establishing a reversal of relation of the focal planes of near and distant object points.

3. In a still camera having lenticulated film each element of which is provided with an effective aperture approximately equal to F2.4, a housing, a slotted diaphragm freely laterally slidable across the forward extremity of said housing, an objective lens having an effective aperture approximately equal to F2.4 and an effective diameter of at least two and one-half inches fixed to said forward housing extremity and covered by said diaphragm, a translucent screen disposed within said housing in the focal plane of the rays of near object points passing through said diaphragm slot, a like second slotted diaphragm mounted aft of and parallel to said translucent screen freely laterally slidable with respect to said housing, a like second objective lens fixed parallel to and immediately aft of said second slotted diaphragm, a film disposed within said housing having its lenticulated surfaces in the focal plane of image rays of near object points in the aforesaid screen passing through said second diaphragm slot, and rack and pinion means inducing like lateral and simultaneous movement of the aforesaid diaphragm slots across the faces of the aforesaid lenses to cause rays from near object points to intersect or focus in the plane of said film surface and rays from more distant object points to focus virtually in or behind said film, thus, in effect, establishing a reversal of relation of the focal planes of near and distant object points.

4. A movable camera having a lens of large effective aperture for producing stereoscopic images, a scanner having a scanning aperture, means to mount the scanner in the lens diaphragm plane, means to support a lenticular sensitive film in the focal plane of the lens, means to move the camera to provide images from different stereoscopic viewpoints, means to relatively move the lens and scanner to scan the lens and means interconnecting the means to move the camera with the scanner moving means.

5. In apparatus for producing pictures in stereoscopic relief, comprising, in combination, a camera having a lens of large effective aperture adapted for use with a sensitized medium having in front of it a screen of lenticular elements, each element of which focuses on said sensitive medium, means movable from one side of the aperture to another to restrict the beams of light from object points during one portion of the exposure to one portion of the lens aperture and during another succeeding portion of the exposure to a different portion of the lens aperture and means for effecting a relative displacement between the beam restricting means and the lens at different speeds in the same direction with respect to said object, while maintaining said lens focused on the object being photographed, whereby the paths of the beams of light from near object points of said images intersect substantially in the plane of said lenticular screen and the paths of the beams of light from more distant object points intersect at points more distant from said lens.

6. In apparatus for producing pictures in stereoscopic relief, in combination, a camera having a relatively large effective aperture, selective means for forming a progressive series of object images from different points of view over a wide angle of view, means for changing the path relation of the converging light beams from near and distant object points with respect to each other and the principal axis of the image forming means while maintaining said lens focused on the object being photographed to thereby obtain proper orientation of corresponding elements of object images for correct viewing and a screen of lenticular elements for forming from each of said object images a plurality of image elements representing strip images of each object image, the image elements of one object image being arranged in juxtaposition to and displaced from corresponding image elements of a succeeding object image in point of view by a small angle to thereby produce a series of stereoscopic panoramas of strip image elements.

7. In apparatus for producing pictures in stereoscopic relief, in combination, a camera having a relatively large effective aperture, selective means for forming a progressive series of object images from different points of view over a wide angle of view and progressively changing the path relation of the converging light beams from near and distant object points with respect to each other and the principal axis of the image forming means while maintaining said lens focused on the object being photographed to thereby obtain proper orientation of corresponding elements of object images for correct viewing, a screen for lenticular elements for forming from each of said object images a plurality of image elements representing strip images of each object image, the image elements of one object image being arranged in juxtaposition to and displaced from corresponding image elements of a succeeding object image in point of view by a small angle to thereby produce a series of stereoscopic panoramas of strip image elements and a sensitized medium located in the space of said strip image elements to produce a picture in stereoscopic relief.

8. In a photographic camera for producing pictures in stereoscopic relief, an optical system, comprising a pair of similar lenses arranged in tandem spaced relation such that the image space of one constitutes the object space of the other, a translucent screen located in the said space and a scanning element for each lens, said elements being similarly arranged and similarly capable of movement across the faces of their respective lenses to respectively form, in succession, from a series of points of view, a corresponding series of object images on said screen and corresponding images of said screen images.

9. In a photographic camera for producing pictures in stereoscopic relief, an optical system, comprising a pair of similar lenses arranged in tandem spaced relation such that the image space of one constitutes the object space of the other, a translucent screen located in the said space and a scanning element for each lens, said elements being so constructed and arranged as to be capable of movement across the faces of their respective lenses to respectively and simultaneously form, in succession, from a series of points of view, a corresponding series of object images on said screen and images of said screen images.

10. In a photographic camera for producing pictures in stereoscopic relief, an optical system, comprising a pair of similar lenses arranged in spaced relation such that the image space of one constitutes the object space of the other, a translucent screen located in the said space, a scanning element for each lens, said elements being so constructed and arranged as to be capable of similar and simultaneous movement across the faces of their respective lenses to respectively form, in succession, from a series of points of view, a corresponding series of object images on said screen and images of said screen images and means for forming from each of said secondary object images a plurality of image elements representing strip images of each of said screen object images with the image elements of one of said screen images arranged in juxtaposition to and displaced from corresponding image elements of a succeeding screen image in point of view by a small angle to thereby produce a panorama of properly orientated strip image elements.

11. In a photographic camera for producing pictures in stereoscopic relief, an optical system, comprising a pair of similar lenses arranged in spaced relation such that the image space of one constitutes the object space of the other, a translucent screen located in the said space, a scanning element for each lens, said elements being so constructed and arranged as to be capable of similar and simultaneous movement across the faces of their respective lenses to respectively and simultaneously form, in succession, from a series of points of view, a corresponding series of object images on said screen and images of said screen images, and lenticular means for forming from each of said secondary object images a plurality of image elements representing strip images of each of said screen object images with the image elements of one of said screen images arranged in juxtaposition to and displaced from corresponding image elements of a succeeding screen image in point of view by a small angle to thereby produce a panorama of properly orientated strip image elements.

12. In a photographic camera for producing pictures in stereoscopic relief, an optical system, comprising a pair of similar lenses arranged in spaced relation such that the image space of one constitutes the object space of the other, a translucent screen located in the said space, a scanning element for each lens, said elements being so constructed and arranged as to be capable of similar and simultaneous movement across the faces of their respective lenses to respectively and simultaneously form, in succession, from a series of points of view, a corresponding series of object images on said screen and images of said screen images, lenticular means for forming from each of said secondary object images a plurality of image elements representing strip images of each of said screen object images with the image elements of one of said screen images arranged in juxtaposition to and displaced from corresponding image elements of a succeeding screen image in point of view by a small angle to thereby produce a panorama of properly orientated strip image elements, and a sensitized medium located substantially in the space of said image elements to produce a picture in stereoscopic relief.

13. In a photographic camera for producing pictures in stereoscopic relief, an optical system, comprising a pair of similar lenses arranged in spaced relation such that the image space of one constitutes the object space of the other, a translucent screen located in the said space, a scanning element for each lens, said elements being so constructed and arranged as to be capable of similar and simultaneous movement across the faces of their respective lenses to respectively and simultaneously form, in succession, from a series of points of view, a corresponding series of object images on said screen and images of said screen images and a screen of transparent refractory material having contiguous cylindrical lenticular elements on the face toward said translucent screen and a sensitized medium on the opposite face thereof for forming from each of said screen object images a plurality representing strip images of each of said object images with the image elements of one of said screen images arranged in juxtaposition to and displaced from corresponding images elements of a succeeding screen image in point of view by a small angle and to thereby produce a picture in stereoscopic relief.

14. The method of forming a stereoscopic image of light rays from an object separated by a large angle which comprises the steps of selecting different like images from slightly different viewpoints, scanning the angle between the rays of said images during selection, dividing the images provided by the scanner into a plurality of lenticular image elements and recording the lenticular image elements on a sensitive element.

15. The method of forming a stereoscopic image of light rays from an object separated by a large angle which comprises the steps of selecting different like images from slightly different viewpoints, scanning the angle between the rays of said images during selection, dividing the images provided by the scanner into a plurality of lenticular image elements with the image elements of one object image arranged in juxtaposition to and displaced from corresponding image elements of an immediately succeeding object image and recording the lenticular image elements on a sensitive element.

16. The method of forming a stereoscopic image of light rays from an object separated by a large angle which comprises the steps of selecting different like images from slightly different viewpoints, scanning the angle between the rays of said images during selection, dividing the images provided by the scanner into a plurality of lenticular image elements and recording the lenticular image elements on a sensitive surface.

17. The method of forming a stereoscopic image of light rays from an object separated by a large angle which comprises the steps of selecting different like images from slightly different viewpoints, scanning the angle between the rays of said images during selection, dividing the images provided by the scanner into a plurality of lenticular image elements with the image elements of one object image arranged in juxtaposition to and displaced from corresponding image elements of an immediately succeeding object image and recording the lenticular image elements on a sensitive surface.

JOHN M. McDONNELL.